US007013536B2

(12) United States Patent
Golden et al.

(10) Patent No.: US 7,013,536 B2
(45) Date of Patent: Mar. 21, 2006

(54) RELEASABLE FASTENER SYSTEMS AND PROCESSES

(75) Inventors: Mark A. Golden, Washington, MI (US); John C. Ulicny, Oxford, MI (US); Alan Lampe Browne, Grosse Pointe, MI (US); Nancy L. Johnson, Northville, MI (US); William Barvosa-Carter, Ventura, CA (US); Thomas B. Stanford, Port Hueneme, CA (US); Leslie A. Momoda, Los Angeles, CA (US)

(73) Assignee: General Motors Corporation, Detroit, MI (US)

( * ) Notice: Subject to any disclaimer, the term of this patent is extended or adjusted under 35 U.S.C. 154(b) by 151 days.

(21) Appl. No.: 10/409,666

(22) Filed: Apr. 8, 2003

(65) Prior Publication Data

US 2004/0074071 A1    Apr. 22, 2004

Related U.S. Application Data

(63) Continuation-in-part of application No. 10/273,691, filed on Oct. 19, 2002.

(51) Int. Cl.
*A44B 18/00* (2006.01)
(52) U.S. Cl. .......................................... 24/442; 428/100
(58) Field of Classification Search ................. 24/442, 24/446, 450, 451, 452, 448, 304; 428/100
See application file for complete search history.

(56) References Cited

U.S. PATENT DOCUMENTS

| 2,717,437 | A | * | 9/1955 | De Mestral ............... 428/92 |
| 2,994,117 | A |   | 8/1961 | McMullin .................. 24/201 |
| 3,101,517 | A |   | 8/1963 | Fox et al. ................. 24/442 |
| 3,128,514 | A |   | 4/1964 | Parker et al. ............ 24/11 HC |
| 3,138,749 | A |   | 6/1964 | Slibitz ..................... 318/135 |
| 3,176,364 | A |   | 4/1965 | Dritz ........................ 24/306 |
| 3,292,019 | A |   | 12/1966 | Hsu et al. ............... 310/328 |
| 3,365,757 | A | * | 1/1968 | Billarant .................. 24/442 |
| 3,469,289 | A | * | 9/1969 | Whitacre .................. 24/450 |

(Continued)

FOREIGN PATENT DOCUMENTS

DE    199 56 011    6/2001

(Continued)

OTHER PUBLICATIONS

U.S. Appl. No. 10/305,424, filed Nov. 2002, "Releasable Fastener System and Process".

(Continued)

*Primary Examiner*—Jack W. Lavinder
(74) *Attorney, Agent, or Firm*—Kathryn A. Marra

(57) ABSTRACT

A releasable fastener system comprises a loop portion and a hook portion. The loop portion includes a support and a loop material disposed on one side thereof. The hook portion generally includes a support and a plurality of closely spaced upstanding hook elements extending from one side thereof. A selected one of the hook elements or the loop material is formed from a thermally and/or electrically conductive material. The other one is formed of a material adapted to melt, flow or volatize at a defined temperature. When the hook portion and loop portion are pressed together they interlock to form a releasable engagement. The resulting joint created by the engagement is relatively resistant to shear and pull forces and weak in peel strength forces. Introducing an activation signal to the thermally and/or electrically conductive hook elements or loop material, causes the opposing material to melt, flow, soften, or volatize upon contact therewith. Also disclosed herein are processes for operating the releasable fastener system.

25 Claims, 4 Drawing Sheets

U.S. PATENT DOCUMENTS

| | | | |
|---|---|---|---|
| 3,490,107 A | 1/1970 | Brumlik | 24/451 |
| 3,808,648 A | 5/1974 | Billarant et al. | 24/450 |
| 4,169,303 A | 10/1979 | Lemelson | 24/452 |
| 4,382,243 A | 5/1983 | Babitzka et al. | 335/219 |
| 4,391,147 A | 7/1983 | Krempl et al. | 73/730 |
| 4,634,636 A | 1/1987 | Yoshino et al. | 428/500 |
| 4,637,944 A | 1/1987 | Walker | 428/35 |
| 4,642,254 A | 2/1987 | Walker | 428/36 |
| 4,693,921 A | 9/1987 | Billarant et al. | 428/100 |
| 4,752,537 A | 6/1988 | Das | 428/614 |
| 4,775,310 A | 10/1988 | Fischer | 425/308 |
| 4,794,028 A | 12/1988 | Fischer | 428/100 |
| 4,931,344 A | 6/1990 | Ogawa et al. | 428/100 |
| 5,037,178 A | 8/1991 | Stoy et al. | 385/53 |
| 5,071,363 A | 12/1991 | Reylek et al. | 439/291 |
| 5,133,112 A | 7/1992 | Gomez-Acevedo | 24/450 |
| 5,136,201 A | 8/1992 | Culp | 310/328 |
| 5,182,484 A | 1/1993 | Culp | 310/328 |
| 5,191,166 A * | 3/1993 | Smirlock et al. | 89/36.02 |
| 5,212,855 A | 5/1993 | McGanty | 24/452 |
| 5,284,330 A | 2/1994 | Carlson et al. | 267/140.14 |
| 5,312,456 A | 5/1994 | Reed et al. | 24/442 |
| 5,319,257 A | 6/1994 | McIntyre | 310/328 |
| 5,328,337 A | 7/1994 | Kunta | 417/310 |
| 5,474,227 A | 12/1995 | Krengel et al. | 228/147 |
| 5,486,676 A | 1/1996 | Aleshin | 219/121.63 |
| 5,492,534 A | 2/1996 | Athayde et al. | 604/141 |
| 5,497,861 A | 3/1996 | Brotz | 188/267 |
| 5,547,049 A | 8/1996 | Weiss et al. | 188/267 |
| 5,611,122 A | 3/1997 | Torigoe et al. | 24/442 |
| 5,656,351 A | 8/1997 | Donaruma | 428/100 |
| 5,657,516 A | 8/1997 | Berg et al. | 24/452 |
| 5,669,120 A | 9/1997 | Wessels et al. | 24/446 |
| 5,671,498 A | 9/1997 | Martin et al. | 15/244.3 |
| 5,712,524 A | 1/1998 | Suga | 310/328 |
| 5,725,928 A * | 3/1998 | Kenney et al. | 428/100 |
| 5,797,170 A | 8/1998 | Akeno | 24/452 |
| 5,798,188 A | 8/1998 | Mukohyama et al. | 429/34 |
| 5,814,999 A | 9/1998 | Elie et al. | 324/662 |
| 5,816,587 A | 10/1998 | Stewart et al. | 280/5.516 |
| 5,817,380 A | 10/1998 | Tanaka | 428/100 |
| 5,885,652 A | 3/1999 | Abbott et al. | 427/163.2 |
| 5,945,193 A * | 8/1999 | Pollard et al. | 428/100 |
| 5,969,518 A | 10/1999 | Merklein et al. | 324/173 |
| 5,974,856 A | 11/1999 | Elie et al. | 73/11.04 |
| 5,979,744 A | 11/1999 | Brigleb | 229/87.01 |
| 5,983,467 A | 11/1999 | Duffy | 24/442 |
| 6,029,783 A | 2/2000 | Wirthlin | 188/267.1 |
| 6,086,599 A * | 7/2000 | Lee et al. | 606/108 |
| 6,102,912 A | 8/2000 | Cazin et al. | 606/61 |
| 6,102,917 A | 8/2000 | Maitland et al. | 606/108 |
| 6,102,933 A | 8/2000 | Lee et al. | 606/209 |
| 6,129,970 A | 10/2000 | Kenney et al. | 428/100 |
| 6,148,487 A | 11/2000 | Billarant | 24/442 |
| 6,156,842 A | 12/2000 | Hoenig et al. | 525/171 |
| 6,203,717 B1 | 3/2001 | Munoz et al. | 252/62.52 |
| 6,257,133 B1 | 7/2001 | Anderson | 100/162 B |
| 6,388,043 B1 | 5/2002 | Langer et al. | 528/80 |
| 6,454,923 B1 | 9/2002 | Dodgson et al. | 204/415 |
| 6,460,230 B1 | 10/2002 | Shimamura et al. | 24/452 |
| 6,502,290 B1 | 1/2003 | Tseng | 28/161 |
| 6,544,245 B1 * | 4/2003 | Neeb et al. | 604/391 |
| 6,546,602 B1 * | 4/2003 | Eipper et al. | 24/442 |
| 6,593,540 B1 | 7/2003 | Baker et al. | 219/121.63 |
| 6,598,274 B1 * | 7/2003 | Marmaropoulos | 24/451 |
| 6,605,795 B1 | 8/2003 | Arcella et al. | 219/121.63 |
| 6,628,542 B1 | 9/2003 | Hayashi et al. | 365/158 |
| 6,681,849 B1 | 1/2004 | Goodson | 166/66.5 |
| 6,740,094 B1 * | 5/2004 | Maitland et al. | 606/108 |
| 6,797,914 B1 | 9/2004 | Speranza et al. | 219/121.64 |
| 6,815,873 B1 | 11/2004 | Johnson et al. | 310/331 |
| 2002/0007884 A1 * | 1/2002 | Schuster et al. | |
| 2002/0050045 A1 | 5/2002 | Chiodo | 29/426.5 |
| 2002/0062547 A1 | 5/2002 | Chiodo et al. | 29/426.5 |
| 2002/0076520 A1 | 6/2002 | Neeb et al. | 428/100 |
| 2002/0142119 A1 | 10/2002 | Seward et al. | 428/36.9 |
| 2003/0120300 A1 | 6/2003 | Porter | 606/191 |
| 2004/0025639 A1 | 2/2004 | Shahinpoor et al. | 75/722 |
| 2004/0033336 A1 | 2/2004 | Schulte | 428/100 |
| 2004/0074061 A1 | 4/2004 | Ottaviani et al. | 24/442 |
| 2004/0074062 A1 | 4/2004 | Stanford et al. | 24/442 |
| 2004/0074064 A1 | 4/2004 | Powell et al. | 24/442 |
| 2004/0074067 A1 | 4/2004 | Browne et al. | 24/442 |
| 2004/0074068 A1 | 4/2004 | Browne et al. | 24/442 |
| 2004/0074069 A1 | 4/2004 | Browne et al. | 24/442 |
| 2004/0074070 A1 | 4/2004 | Momoda et al. | 24/442 |
| 2004/0117955 A1 | 6/2004 | Barvosa-Carter et al. | 24/442 |

FOREIGN PATENT DOCUMENTS

| | | |
|---|---|---|
| EP | 0385443 | 2/1990 |
| EP | 0385443 | 9/1990 |
| EP | 0673709 | 9/1995 |
| JP | 401162587 | 6/1989 |
| JP | 4-314446 | 4/1992 |
| JP | 4-266970 | 9/1992 |
| JP | 08260748 | 10/1996 |
| WO | WO99/42528 | 8/1999 |
| WO | WO 99/42528 | 8/1999 |
| WO | WO00/62637 | 10/2000 |
| WO | WO 00/62637 | 10/2000 |
| WO | WO01/84002 | 11/2001 |
| WO | WO02/45536 | 6/2002 |

OTHER PUBLICATIONS

U.S. Appl. No. 10/305,376, filed Nov. 2002, "Releasable Fastener System".

U.S. Appl. No. 10/305,384, filed Nov. 2002, "Releasable Fastener System".

* cited by examiner

RELEASABLE FASTENER SYSTEMS AND PROCESSES

CROSS REFERENCE TO RELATED APPLICATIONS

This application is a continuation in part application and claims priority to U.S. patent application Ser. No. 10/273,691 filed Oct. 19, 2002 incorporated herein by reference in its entirety.

BACKGROUND

This disclosure relates to releasable attachment devices of the type used to fasten, retain, or latch together components of an apparatus or a structure that are to be rapidly separated or released under controlled conditions.

Hook and loop type separable fasteners are well known and are used to join two members detachably to each other. These types of fasteners generally have two components disposed on opposing member surfaces. One component typically includes a plurality of resilient hooks while the other component typically includes a plurality of loops. When the two components are pressed together they interlock to form a releasable engagement. The resulting joint created by the engagement is relatively resistant to shear and pull forces, and weak in peel strength forces. As such, peeling one component from the other component can be used to separate the components with a minimal applied force. As used herein, the term "shear" refers to an action or stress resulting from applied forces that causes or tends to cause two contiguous parts of a body to slide relatively to each other in a direction parallel to their plane of contact. The term "pull force" refers to an action or stress resulting from applied forces that causes or tends to cause two contiguous parts of a body to move relative to each other in a direction perpendicular to their plane of contact.

BRIEF SUMMARY

Disclosed herein is a releasable fastener system and processes for operating the releasable fastener systems. In one embodiment, a releasable fastener system comprises a hook portion comprising a hook support and a plurality of hook elements, wherein the hook elements and/or hook support comprise a material adapted to melt, flow, or volatize at a defined temperature; a loop portion comprising a loop material and a loop support, wherein the loop material comprises an electrically and thermally conductive material; and an activation device in electrical communication with the loop material, wherein the activation device is adapted to provide an activation signal to the loop material and heat the loop material to a temperature equal to or greater than the defined temperature.

In another embodiment, a releasable fastener system comprises a hook portion comprising a hook support and a plurality of hook elements, wherein the hook elements comprises an electrically and thermally conductive material; a loop portion comprising a loop material and a loop support, wherein the loop material and/or loop support comprises a material adapted to melt, flow, soften, or volatize at a defined temperature; and an activation device in electrical communication with the hook elements, wherein the activation device is adapted to provide an activation signal to the hook elements and heat the hook elements to a temperature equal to or greater than the defined temperature.

In another embodiment, a releasable fastener system comprises a hook portion comprising a hook support and a plurality of hook elements formed on the hook support, wherein the plurality of hook elements comprises a thermally conductive material; a loop portion comprising a loop material and a loop support, wherein the loop material comprises a thermoplastic material; and an activation device in electrical communication with the hook support, wherein the activation device is adapted to provide an activation signal to the hook support and heat the hook support to a temperature equal to or greater than the defined temperature.

In another embodiment, a releasable fastener system comprises a hook portion comprising a hook support and a plurality of hook elements, wherein the hook elements comprises a thermoplastic material; a loop portion comprising a loop support and a loop material formed on the loop support, wherein the loop material comprises a thermally conductive material; and an activation device in electrical communication with the loop support, wherein the activation device is adapted to provide an activation signal to the loop support and heat the loop support to a temperature equal to or greater than the defined temperature.

An on-demand process for releasing a releasable fastener system comprises applying a current to an engaged releasable fastener system, wherein the releasable fastener system comprises a hook portion comprising a hook support and a plurality of hook elements, wherein the hook elements comprise a material adapted to melt, flow, soften, or volatize at a defined temperature, a loop portion comprising a loop material and a loop support, wherein the loop material comprises an electrically and thermally conductive material, and an activation device in electrical communication with the loop material, wherein the activation device is adapted to provide an activation signal to the loop material and heat the loop material to a temperature equal to or greater than the defined temperature; and melting, flowing, or volatizing a portion of the hook elements in contact with the loop material and releasing the hook portion from the loop portion.

In another embodiment, an on-demand process for releasing a releasable fastener system comprises applying a current to an engaged releasable fastener system, wherein the releasable fastener system comprises a hook portion comprising a hook support and a plurality of hook elements, wherein the hook elements comprise an electrically and thermally conductive material adapted to melt, flow, soften, or volatize at a defined temperature, a loop portion comprising a loop material and a loop support, wherein the loop material comprises a material adapted to melt, flow, soften, or volatize at a defined temperature, and an activation device in electrical communication with the hook elements, wherein the activation device is adapted to provide an activation signal to the hook elements and heat the hook elements to a temperature equal to or greater than the defined temperature; and melting, flowing, or volatizing a portion of the loop material in contact with the hook elements and releasing the hook portion from the loop portion.

The above-described and other features are exemplified by the following figures and detailed description.

BRIEF DESCRIPTION OF THE DRAWINGS

Referring now to the figures, which are exemplary embodiments and wherein like elements are numbered alike.

DETAILED DESCRIPTION

A releasable fastener system for providing rapid release upon receipt of an activation signal generally comprises a hook portion and a loop portion. The hook portion includes a plurality of hook elements disposed on a hook support. The loop portion includes a loop material disposed on a loop support. At least one of the loop material or the plurality of hook elements is designed to have a portion of its structure adapted to increase in temperature upon receipt of an activation signal such that contact with an opposing loop material or hook element melts, fractures, or vaporizes the opposing loop material or hook material, thereby providing quick release of the hook portion from the loop portion. Preferably, the quick release mechanism provides complete release of the hook portion from the loop portion in a time period on the order of milliseconds upon receipt of the activation signal.

Figure 1:
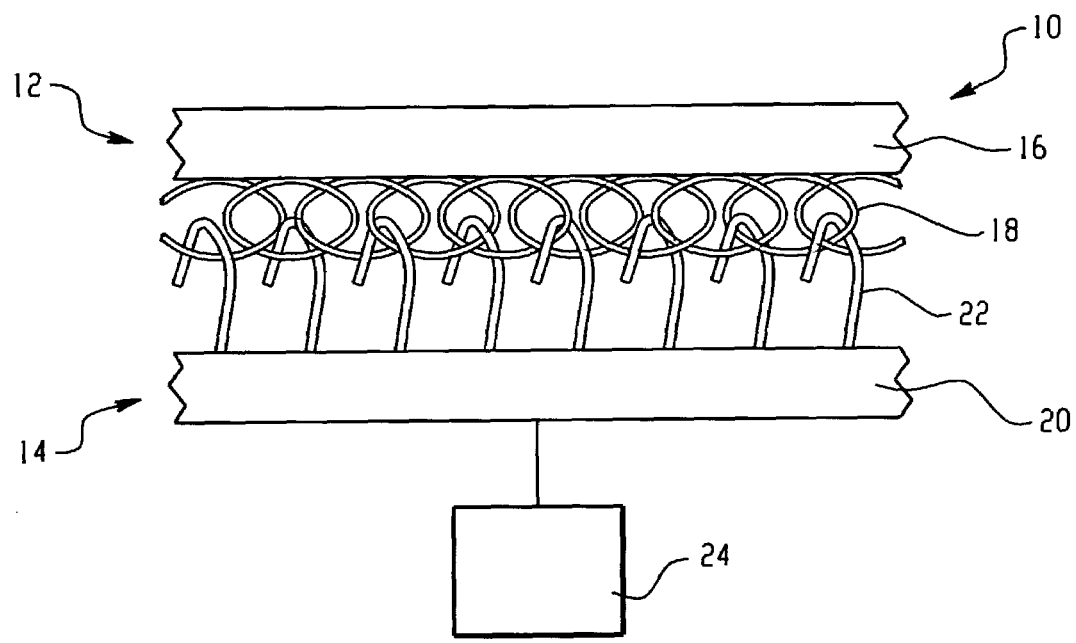
FIG. 1 shows a cross sectional view of the releasable fastener system in an engaged position.

Referring now to FIG. 1, there is depicted a quick release fastener system, generally indicated as 10, which comprises a loop portion 12 and a hook portion 14. The loop portion 12 includes a support 16 and a loop material 18 attached on one side thereof whereas the hook portion 14 includes a support 20 and a plurality of closely spaced upstanding hook elements 22 extending from one side thereof. Coupled to and in operative communication with the hook elements 22 (and/or the loop material 18 depending on the desired application) is an activation device 24.

During engagement, the two portions 12, 14 are pressed together to create a joint that is relatively strong in shear and/or pull-off directions, and weak in a peel direction. For example, as shown in FIG. 1, when the two portions 12, 14 are pressed into face-to-face engagement, the hook elements 22 become engaged with the loop material 18 and the close spacing of the hook elements 22 resists substantial lateral movement when subjected to shearing forces in the plane of engagement. Similarly, when the engaged joint is subjected to a force substantially perpendicular to this plane, (i.e., pull-off forces), the hook elements 22 resist substantial separation of the two portions 12, 14. When the hook elements 22 are subjected to a peeling force, the hook elements 22 can become disengaged from the loop material 18 with minimal resistance, thereby separating the hook portion 12 from the loop portion 14. It should be noted that separating the two portions 12, 14 using the peeling force generally requires that one or both of the supports forming the hook portion 14 and loop portion 12 be flexible.

Figure 2:
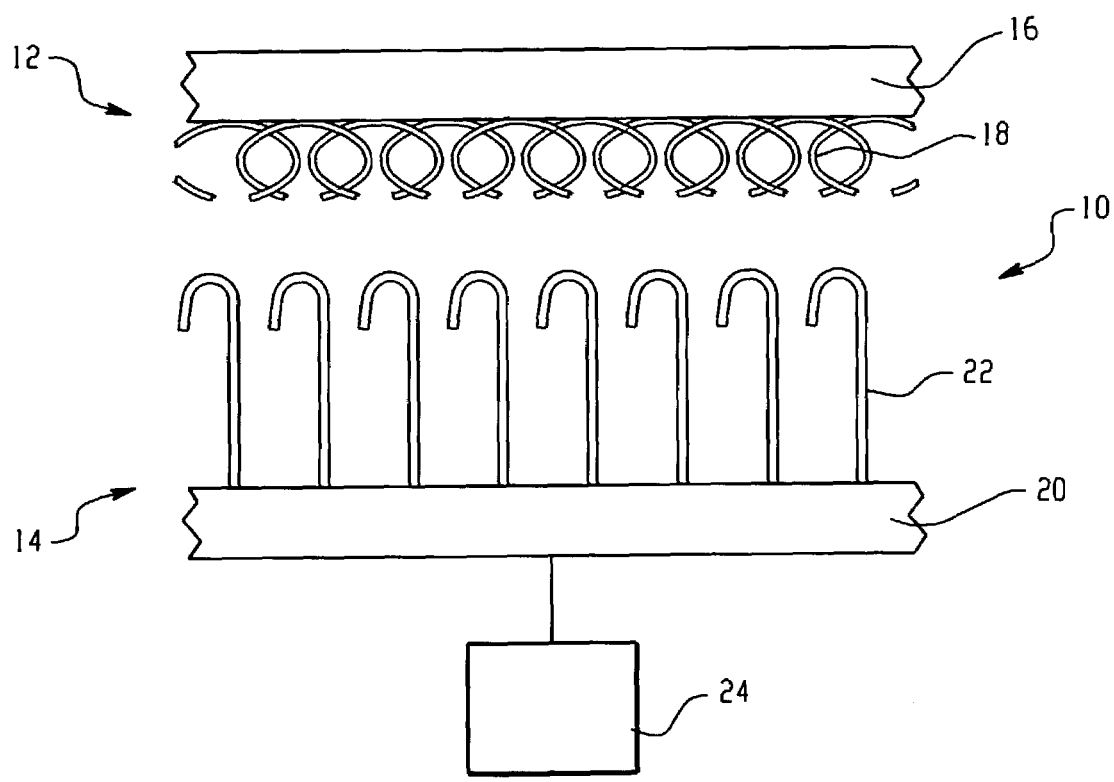
FIG. 2 shows a cross sectional view of the releasable fastener system of FIG. 1 in a disengaged position.

During disengagement, the activation device 24 is adapted to provide an activation signal to the loop portion 12 or the hook portion 14 depending on the application and heat the loop material or the hook elements to a temperature equal to or greater than a defined temperature. At least one of the loop material or the plurality of hook elements is designed to have a portion of its structure adapted to increase in temperature upon receipt of an activation signal such that contact with an opposing loop material or hook element melts, fractures, or vaporizes the opposing loop material or hook material, thereby providing quick release of the hook portion from the loop portion. FIG. 2 illustrates one such embodiment, wherein the hook elements 22 are fabricated with a thermally and/or electrically conductive material and the loop material is fabricated from a material adapted to melt, flow, soften, or volatize upon contact with the hook elements after receipt of the activation signal. Preferably, the activation signal instantaneously or nearly instantaneously provides on demand disengagement in a time period on the order of milliseconds. As shown in FIG. 2, a portion of the loop material melts, flows, or volatizes upon contact with the activated hook elements. The shape orientation of the hook elements 22 may remain the same or change upon application of the activation signal. Alternately, this flowable, meltable, or volatilizable portion may also be at the point of attachment of the loop to its base or support, in which case the hook and loop elements remain engaged, but the loop element disengages from its support.

In one embodiment, the activation device 24, on demand, provides an activation signal to the loop material 18 that causes an increase in the temperature of the loop material 18. In this embodiment, the loop material 18 is preferably fabricated from a thermally conductive material and the hook elements 22 are preferably fabricated from a thermoplastic or thermoset polymer having a definable glass transition temperature (Tg) or melting temperature (Tm). More preferably, the loop material 18 is fabricated from a thermally and electrically conductive material. The activation signal provides a current to the loop material 18, which is effective to increase the temperature and melt, fracture, or vaporize the portion of the hook element 22 in contact with the loop material 18, thereby providing quick release of the loop portion 12 from the hook portion 14. For example, the increase in temperature preferably causes the portion of the loop material 18 in contact with the hook element 22 to thermally flow. In other words, the temperature of each loop material 18 is equal to or greater than the Tg of the hook element 22 or is equal to or greater than the Tm. The increase in temperature generally remains for the duration of the applied activation signal. Upon discontinuation of the activation signal, the hook portion 14 and the loop portion 12 can become reengaged upon pressing engagement since melting, fracture, or volatization preferably occurs only with those portions of the hook elements 22 in direct contact with the loop material 18. Because the hook portion 14 can be configured with a plurality of hook elements, it is assumed that some of the hook elements will not be utilized in the face-to-face engagement with the loop material. However, since the number of hook elements is a finite number, it is expected that continued reuse of the hook portion 14 is generally limited.

In another embodiment, the hook elements 22 are preferably fabricated from the thermally conductive material and the loop material 18 is preferably fabricated from the thermoplastic or thermoset polymer having the definable Tg or Tm. More preferably, the hook elements are fabricated from an electrically and thermally conductive material. The activation device 24, on demand, provides an activation signal to the hook elements 22 that causes an increase in the temperature of the hook elements 22. The increase in temperature to the hook elements 22 is preferably effective to melt, fracture, or volatize the portion of the loop material 18 in contact with the hook element 22, thereby providing quick release of the hook portion 14 from the loop portion 12. Alternately, this flowable, meltable, or volatilizable portion may also be at the point of attachment of the loop to its base or support, in which case the hook and loop elements remain engaged, but the loop element disengages from its support. The increase in temperature generally remains for the duration of the applied activation signal. As described in the previous embodiment, the hook portion and loop portion may be reengaged numerous times before the loop material 18 is rendered ineffective for providing suitable resistance to shear, pull and peel forces.

Figure 3:
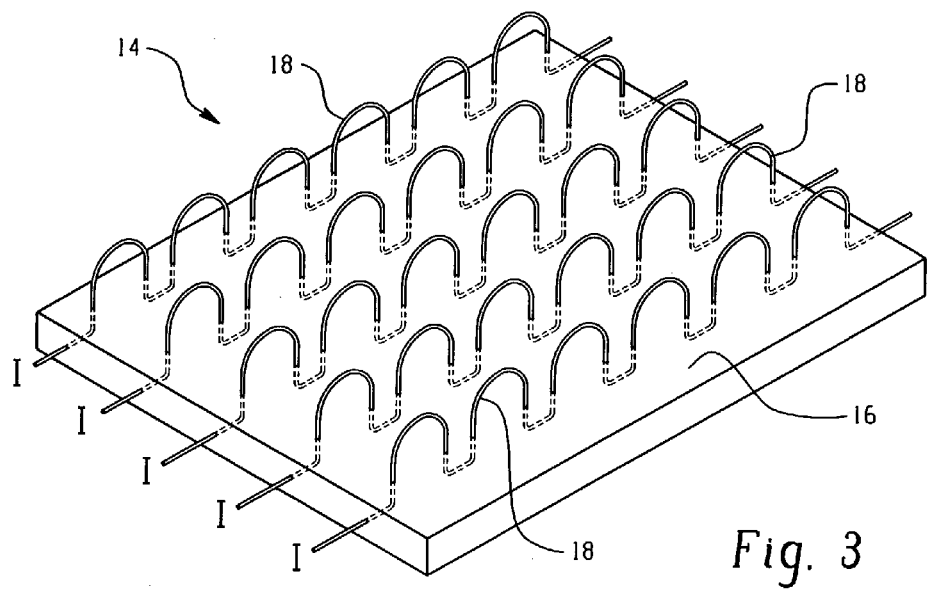
FIG. 3 shows a perspective view of a loop material in accordance with one embodiment.

FIG. 3 illustrates an exemplary loop portion 14 fabricated from the thermally conductive materials or the thermally and electrically conductive materials as previously described. The loop material 18 generally comprises a randomly looped pattern or pile of a material. The loop material 18 is often referred to by such terms as the "soft", the "fuzzy", the "pile", the "female", or the "carpet". The loop material 18 may be integrated with the support 16 or may be attached to the support 16 as previously described. In one embodiment, the loop material 18 is in electrical communication with a power source such that a current can flow through the loop material. The loop material 18 generally comprises a plurality of filaments of the thermally conductive materials or the thermally and electrically conductive materials preferably threaded through the support 16 to form the loops. Each filament of the loop material 18 is configured to have a defined resistance effective to heat the loop material 18 at a predefined current, i.e., resistive heating. In this manner, the loop material 18 can be orderly disposed on the support in columns, if desired for the application.

Figure 4:
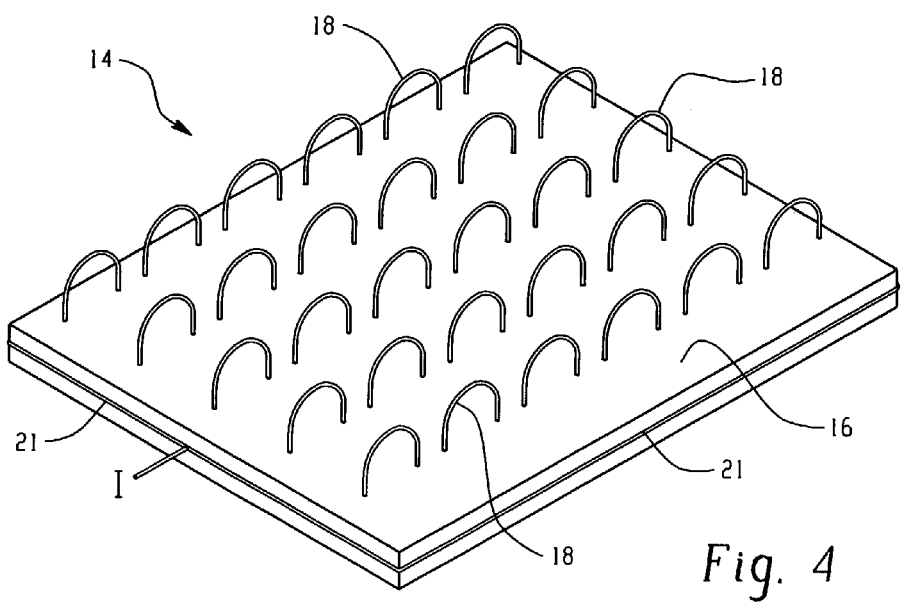
FIG. 4 shows a perspective view of a loop material in accordance with another embodiment.

In another embodiment, as shown in FIG. 4, the support 16 is adapted to provide sufficient thermal energy to the loop material to melt or thermally flow the portion of the hook element in contact therewith. The support 16 may be formed of a resistive block or the like adapted to be heated upon introduction of a current, e.g., resistive element(s) 21 sandwiched within a ceramic block. The loop material 18 in contact with the support 16 would then be heated by thermal conductivity to a temperature effective to melt, fracture, or volatize the hook elements 22 in contact therewith.

Figure 5:
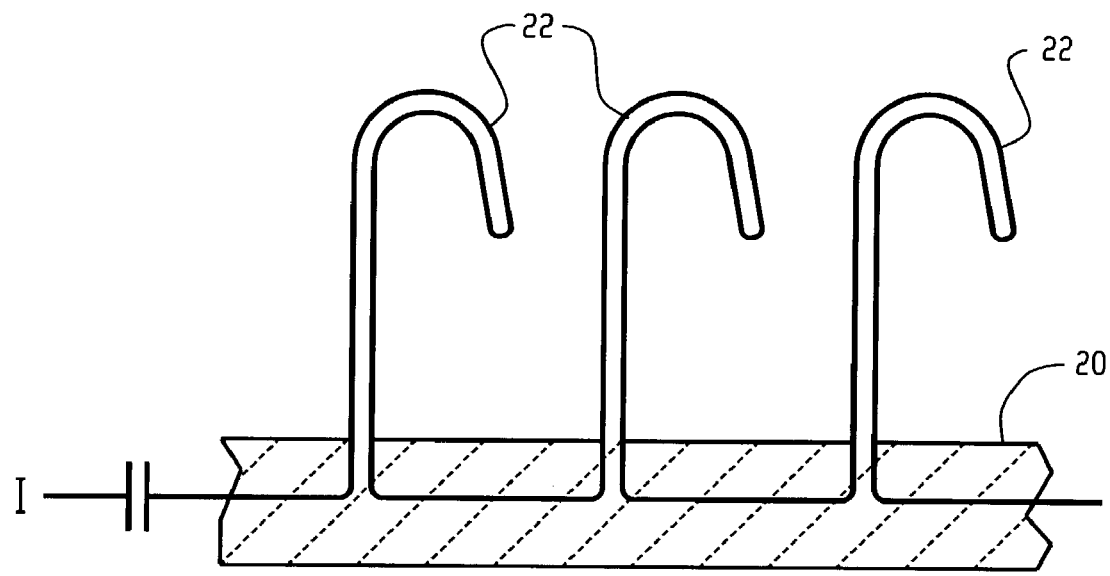
FIG. 5 shows a perspective view of a hook portion in accordance with one embodiment.
Figure 6:
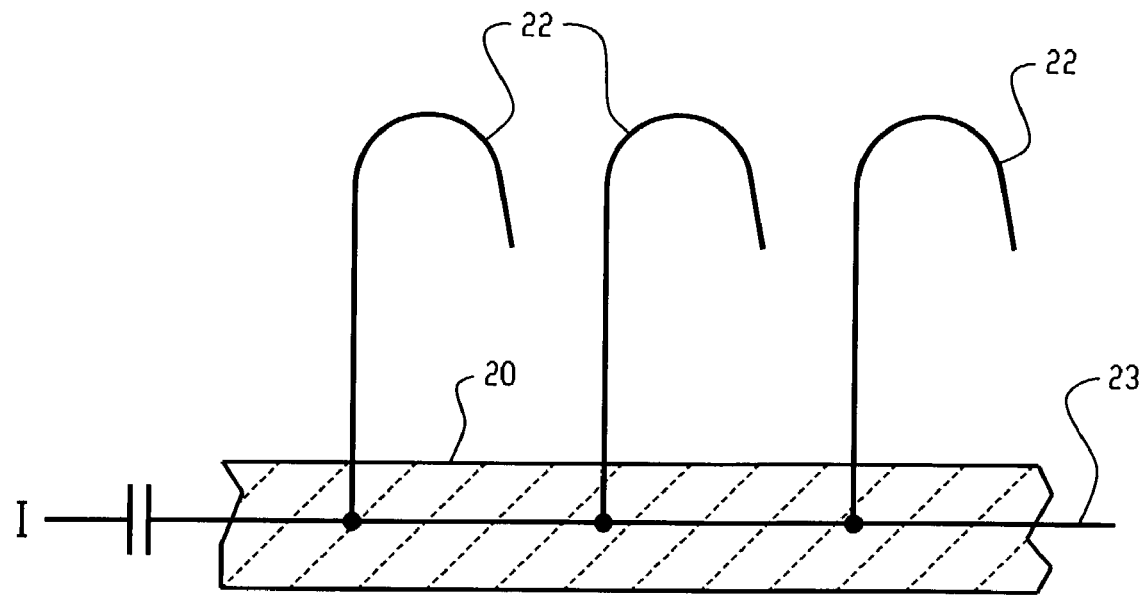
FIG. 6 shows a perspective view of a hook portion in accordance with another embodiment.

FIG. 5 illustrates an exemplary hook portion 14 fabricated from thermally conductive materials or thermally and electrically conductive materials as previously described. In this embodiment, the hook elements 22 are in electrical communication with a power source such that a current can flow through the hook elements 22 or be used to heat the hook elements 22. For example, the plurality of hook elements 22 may be shaped from the electrically and thermally conductive material as shown in FIG. 5, wherein an insulator, e.g., air, is formed between opposing wires. The hook elements can be adhesively applied to the support 20 or embedded (as shown) in the support 20. Current flowing through the electrically conductive hook elements 22 would resistively heat to a temperature sufficient to melt, fracture, or volatize the portion of the loop material in contact therewith. Alternatively, as shown in FIG. 6, the hook elements may be thermally conductive and attached to a resistive wire or filament 23 disposed in or on a surface of the hook support 20. Upon flow of a suitable current, the resistance provided by the wire or filament heats the thermally conductive hook element to cause the portion of the loop material in contact therewith to melt, fracture, or volatize.

In another embodiment, the hook elements or loop elements are attached to a support 16 through an adhesive, which forms a bond between the hook or loop portion and the support. Current flowing through the electrically conductive support would resistively heat to a temperature sufficient to melt, fracture, soften, or volatize the adhesive bonding the loop or hook in contact therewith, causing disengagement of the hook or loop from the support.

Figure 7:
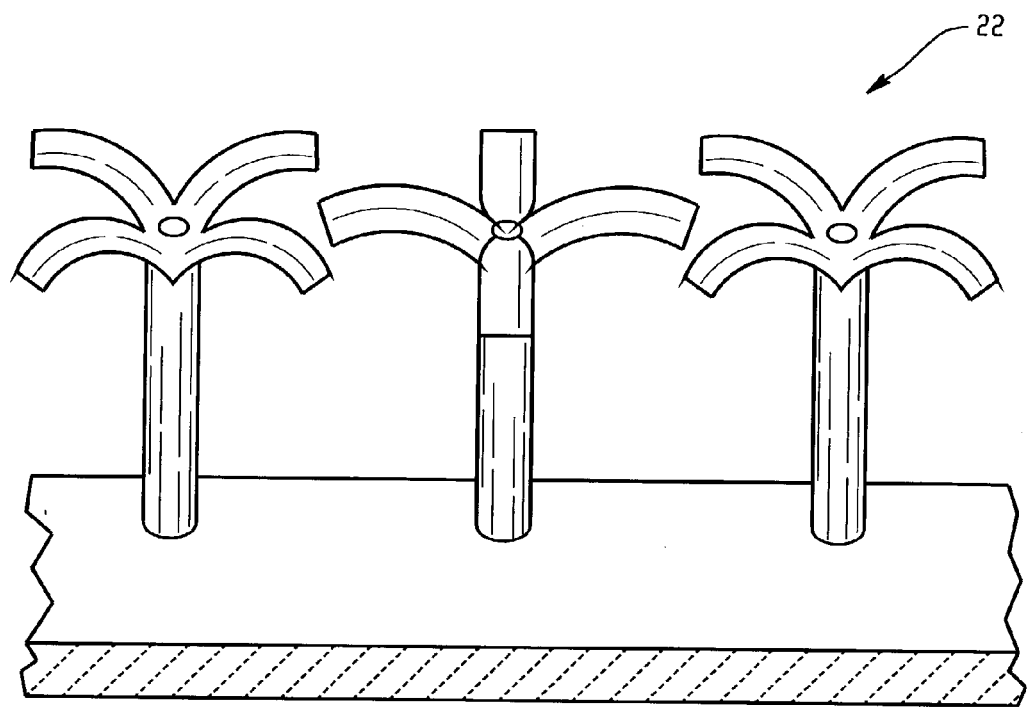
FIG. 7 shows a perspective view of a hook element in accordance with one embodiment.
Figure 8A:
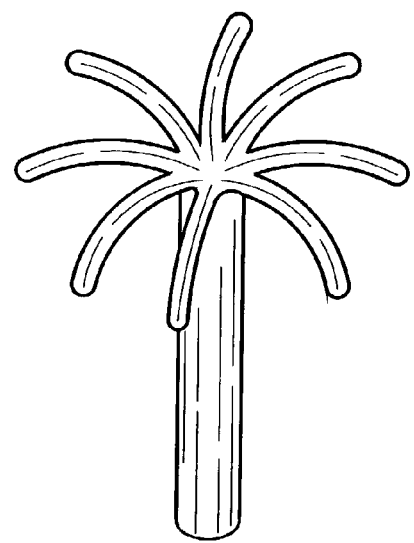
FIG. 8 shows a perspective view of a hook element in accordance with another embodiment.
Figure 8B:
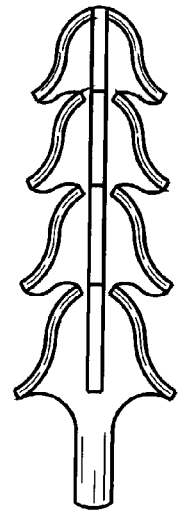

The illustrated releasable fastener systems 10 are exemplary only and are not intended to be limited to any particular shape, size, configuration, number or shape of hook elements 22, shape of loop material 18, or the like. For example, as shown in FIGS. 7 and 8, the hook elements 22 may comprise a trunk portion with fingers radially extending at one end of the trunk, wherein the other end is connected to the hook support 20. The number of fingers may vary depending on the intended application. Alternatively, the radially extending fingers could project along a length of the trunk as shown more clearly in FIG. 8. This alternative embodiment would be advantageous to provide repetitive use of the hook portion when the hook elements 22 are fabricated from the thermoplastic or thermoset material.

The hook elements 22 or loop material 18 may be formed integrally with the respective support 16 or 20, or more preferably, may be attached to the respective support 16 or 20. Preferably, the materials employed for fabricating the loop material 18 or hook elements 22 and the thicknesses employed are chosen to provide the hook elements with resiliency and flexibility.

In practice, the spacing between adjacent hook elements 22 is in an amount effective to provide the hook portion 14 with sufficient shear, peel, and/or pull off resistance desired for the particular application during engagement with the loop portion 12. Depending on the desired application, the amount of shear, peel, and/or pull-off force required for effective engagement can vary significantly. Generally, the closer the spacing and the greater number of the hook elements 22 employed will result in increased shear, peel, and/or pull off forces upon engagement. The hook elements 22 preferably have a shape configured to become engaged with the loop material 18 upon pressing contact of the loop portion 12 with the hook portion 14, and vice versa. As such, the hook elements 22 are not intended to be limited to any particular shape. In the engaged mode, the hook elements 22 can have an inverted J-shaped orientation, a mushroom shape, a knob shape, a multi-tined anchor shape, T-shape, spiral shape, or any other mechanical form of a hook-like element used for separable hook and loop fasteners. Such elements are referred to herein as "hook-like", "hook-type", or "hook" elements whether or not they are in the shape of a hook. Likewise, the loop material may comprise a plurality of loops or pile, a shape complementary to the hook element (e.g., a female and male engagement), or any other mechanical form of a loop-like element used for separable hook and loop fasteners.

The arrays of hook elements 22 of various geometries and/or loop material 18 on the two supports 16, 20 are to be so arranged and sufficiently dense such that the action of pressing the two portions 12, 14 together results in the mechanical engagement of the hook elements 22 with the loop material 18 creating a joint that is strong in shear and pull-off forces, and relatively weak in peel. Remote disengagement of the two portions 12, 14 is effected variously by raising the temperature of the hook element or loop material (depending on the configuration) to or greater than the melt, flow, softening or vaporization temperature in which the loop material 18 or hook elements 22 are in contact. In this manner, by changing the temperature provided to the hook elements 22 or loop material 18, an on-demand, rapid remote engagement and disengagement of joints/attachments are offered.

Furthermore, the geometry, configuration and size of the loop or hook elements are not limited to those illustrated above. Suitable shapes may also include a loop (or hook) element, which consists of a continuous block of thermoplastic or thermoset material within which the opposing hook (or loop) element is embedded. Engagement is accomplished by heating the loop element above a predefined temperature, engaging the hooks and then cooling below the predefined temperature while maintaining engagement. In this case, the form of the loop is a negative image of the hook and is determined by the hook engagement process. Release is the affected by causing an increase in the temperature of the loop element, effective to melt, fracture, soften, or volatize the loop material, thereby providing quick release of the hook portion.

The supports 16 (loop portion 12) or 20 (hook portion 14) may be rigid or flexible depending on the intended application. Suitable materials for fabricating either support include plastics, fabrics, ceramics, metals, and the like. For example, suitable plastics include thermoplastics such as for example polypropylene, polyethylene, polyamide, polyester, polystyrene, polyvinyl chloride, acetal, acrylic, polycarbonate, polyphenylene oxide, polyurethane, polysulfone, and other like thermoplastic polymers. In the event that the support includes the thermally or the thermally and electrically conductive loop material or the hook elements, the support material should be chosen to provide the desired insulative properties as well as be able to withstand the temperatures employed upon heating of the loop material 18 or the hook elements 22. An adhesive may be applied to the backside surface of the support (the surface free from the hook elements 22 or loop material 18) for application of the releasable fastener system to an apparatus or structure. Alternatively, the releasable fastener system 10 may be secured to an apparatus or structure by bolts, by welding, or any other mechanical securement means. It should be noted that, unlike traditional hook and loop fasteners, both supports 16, 20 could be fabricated from a rigid or inflexible material in view of the remote releasing capability provided. Traditional hook and loop fasteners typically require at least one support to be flexible so that a peeling force can be applied for separation of the hook and loop fastener.

The thermally conductive materials or the thermally and electrically conductive materials utilized for the loop materials or hook elements can be any thermally and electrically conductive metal filament or wires and/or polymer. Suitable metal filaments or wires include thermally and/or electrically conductive such as copper, aluminum, and the like. Suitable polymers include electrically conductive polymers include, but are not intended to be limited to, polyphenylene, polyaniline, polyacetylene, polydiacetylenes, polypyrrole, polythiophenes, poly(phenylsulfides), poly(phenylene vinylene), poly (3-alkylthiophenes), poly (aryl vinylenes), derivatives of tetraazaporphyrin or phthalocyanine, polyazulene, polycarbazole, polyindole, polypyrene, polyazepine, polyfulvenes, polyindophenines, charge transfer compleses such as bisethylene dithiotetrathiofulvalene, fullerenes, dicyanodiimine quinone, or combinations comprising at least one of the foregoing polymers.

The thermoplastic or thermoset materials can be any material that will melt, fracture, or volatize upon contact with the thermally and/or electrically conductive material at or above a defined temperature. Preferably, the thermoplastic or thermoset materials have a definable Tg or Tm. Suitable thermoplastic or thermoset materials include polymers such as polyalkenes (e.g., polyethylene, polypropylene, and the like), polycarbonates, polyesters, polycarbonates, polyacrylates, polybutylenes, polystyrenes, polyacrylonitriles, polyvinylchlorides, acetals, polyamides (e.g., nylons), polysulfones, polyurethanes, acrylates, polyphenylene oxide, and other like thermoplastic polymers.

Other suitable materials include shape memory polymers. Shape memory polymers can be thermoplastics, interpenetrating networks, semi-interpenetrating networks, or mixed networks. The polymers can be a single polymer or a blend of polymers. The polymers can be linear or branched thermoplastic elastomers with side chains or dendritic structural elements. Suitable polymer components to form a shape memory polymer include, but are not limited to, polyphosphazenes, poly(vinyl alcohols), polyamides, polyester amides, poly(amino acid)s, polyanhydrides, polycarbonates, polyacrylates, polyalkylenes, polyacrylamides, polyalkylene glycols, polyalkylene oxides, polyalkylene terephthalates, polyortho esters, polyvinyl ethers, polyvinyl esters, polyvinyl halides, polyesters, polylactides, polyglycolides, polysiloxanes, polyurethanes, polyethers, polyether amides, polyether esters, and copolymers thereof. Examples of suitable polyacrylates include poly(methyl methacrylate), poly (ethyl methacrylate), poly(butyl methacrylate), poly(isobutyl methacrylate), poly(hexyl methacrylate), poly(isodecyl methacrylate), poly(lauryl methacrylate), poly(phenyl methacrylate), poly(methyl acrylate), poly(isopropyl acrylate), poly(isobutyl acrylate) and poly(octadecyl acrylate). Examples of other suitable polymers include polystyrene, polypropylene, polyvinyl phenol, polyvinylpyrrolidone, chlorinated polybutylene, poly(octadecyl vinyl ether), ethylene vinyl acetate, polyethylene, poly(ethylene oxide)-poly (ethylene terephthalate), polyethylene/nylon (graft copolymer), polycaprolactones-polyamide (block copolymer), poly (caprolactone) dimethacrylate-n-butyl acrylate, poly (norbornyl-polyhedral oligomeric silsequioxane), polyvinylchloride, urethane/butadiene copolymers, polyurethane block copolymers, styrene-butadiene-styrene block copolymers, and the like.

The activation device 24 is adapted to provide a current to the electrically conductive material. As such, the activation device can be any power supply adapted to provide the current including alternating and direct current power sources.

The disclosure is further illustrated by the following non-limiting example.

EXAMPLE

In this example, a releasable fastener system in accordance with the present disclosure was fabricated. A hook portion was a 2 inch by 4 inch strip of an industrial strength grade VELCRO® commercially available from the Home Depot Corporation. The hook elements were fabricated from nylon. A 30 gauge Chromel wire was inserted into about 43 hooks across a 2 inch section of the VELCRO® and suspended. A small weight was attached to the VELCRO® to provide a downward tension to the fastened system. A current of 5 Amps at 14 volts was applied to the wire to heat the wire. The fastener system released in less than about one second.

While the invention has been described with reference to one exemplary embodiment, it will be understood by those skilled in the art that various changes may be made and equivalents may be substituted for elements thereof without departing from the scope of the invention. In addition, many modifications may be made to adapt a particular situation or material to the teachings of the disclosure without departing from essential scope of the invention. Therefore, it is intended that the invention not be limited to the particular embodiment disclosed as the best mode contemplated for carrying out this invention, but that the invention will include all embodiments falling within the scope of the appended claims.

What is claimed is:

1. A releasable fastener system comprising:
   a hook portion comprising a hook support and a plurality of hook elements, wherein the hook elements comprise a material adapted to break at a defined temperature;
   a loop portion comprising a loop material and a loop support, wherein the loop material comprises an electrically and thermally conductive material; and
   an activation device in electrical communication with the loop material, wherein the activation device is adapted to provide an activation signal to the loop material and heat the loop material to a temperature equal to or greater than the defined temperature to effect the break.

2. The releasable fastener system of claim 1, wherein the hook elements comprise a thermoplastic, a shape memory, or thermoset material.

3. The releasable fastener system of claim 2, wherein the thermoplastic, thermoset, or shape memory material comprises polyphosphazenes, poly(vinyl alcohols), polyester amides, poly(amino acid)s, polyanhydrides, polyacrylamides, polyalkene glycols, polyalkene oxides, polyalkene terephthalates, polyortho esters, polyvinyl ethers, polyvinyl esters, polyvinyl halides, polylactides, polyglycolides, polysiloxanes, polyurethanes, polyethers, polyether amides, polyether esters, polyalkenes, polyesters, polycarbonates, polyacrylates, polybutylenes, polystyrenes, polyacrylonitriles, acetals, polyamides, polysulfones, polyurethanes, polyphenylene oxide, or combinations comprising at least one of the foregoing materials.

4. The releasable fastener system of claim 1, wherein the activation signal comprises an electrical current, wherein the electrical current is effective to heat the loop material to the temperature equal to or greater than the defined temperature.

5. The releasable fastener system of claim 1, wherein the hook element comprise a shape comprising a J-shaped orientation, a mushroom shape, a knob shape, a multi-tined anchor shape, a T-shape, a spiral shape, a barbed shaft shape, a grappling hook shape, or combinations comprising at least one of the foregoing shapes.

6. The releasable fastener system of claim 1, wherein the loop material comprises a shape adapted to be engaged with the hook elements when the hook portion is pressed into face-to-face engagement with the loop portion.

7. The releasable fastener system of claim 1, wherein the loop material comprises a metal.

8. A releasable fastener system comprising:
   a hook portion comprising a hook support and a plurality of hook elements, wherein the book elements comprises an electrically and thermally conductive material;
   a loop portion comprising a loop material and a loop support, wherein the loop material comprises a material adapted to break at a defined temperature; and
   an activation device in electrical communication with the hook elements, wherein the activation device is adapted to provide an activation signal to hook elements and heat the hook elements to a temperature equal to or greater than the defined temperature to effect the break.

9. The releasable fastener system of claim 8, wherein the loop material comprises a thermoplastic, a shape memory, or thermoset material.

10. The releasable fastener system of claim 9, wherein the thermoplastic, thermoset, or shape memory material comprises polyphosphazenes, poly(vinyl alcohols), polyester amides, poly(amino acid)s, polyanhydrides, polyacrylamides, polyalkene glycols, polyalkene oxides, polyalkene terephthalates, polyortho esters, polyvinyl ethers, polyvinyl esters, polyvinyl halides, polylactides, polyglycolides, polysiloxanes, polyurethanes, polyethers, polyether amides, polyether esters, polyalkenes, polyesters, polycarbonates, polyacrylates, polybutylenes, polystyrenes, polyacrylonitriles, acetals, polyamides, polysulfones, polyurethanes, polyphenylene oxide, or combinations comprising at least one of the foregoing materials.

11. The releasable fastener system of claim 8, wherein the activation signal comprises an electrical current, wherein the electric current is effective to heat the hook elements to the temperature equal to or greater than the defined temperature.

12. The releasable fastener system of claim 8, wherein the hook element comprise a shape comprising a J-shaped orientation, a mushroom shape, a knob shape, a multi-tined anchor shape, a T-shape, a spiral shape, a barbed shaft shape, a grappling hook shape, or combinations comprising at least one of the foregoing shapes.

13. The releasable fastener system of claim 8, wherein the hook elements comprise a metal.

14. A releasable fastener system comprising:
   a hook portion comprising a hook support and a plurality of hook elements formed on the hook support, wherein the plurality of hook elements comprises a thermally conductive material;
   a loop portion comprising a loop material and a loop support, wherein the loop material comprises a thermoplastic, thermoset, or shape memory material adapted to break at a defined temperature; and
   an activation device in electrical communication with the hook support, wherein the activation device is adapted to provide an activation signal to the hook support and heat the hook support to a temperature equal to or greater than the defined temperature to effect the break.

15. The releasable fastener system of claim 14, wherein the thermally conductive material comprises a metal.

16. The releasable fastener system of claim 14, wherein the activation signal comprises an electric current, wherein the electric current is effective to heat the hook support to the temperature equal to or greater than the defined temperature.

17. The releasable fastener system of claim 14, wherein the thermoplastic, thermoset, or shape memory material comprises polyphosphazenes, poly(vinyl alcohols), polyester amides, poly(amino acid)s, polyanhydrides, polyacrylamides, polyalkene glycols, polyalkene oxides, polyalkene terephthalates, polyortho esters, polyvinyl ethers, polyvinyl esters, polyvinyl halides, polylactides, polyglycolides, polysiloxanes, polyurethanes, polyethers, polyether amides, polyether esters, polyalkenes, polyesters, polycarbonates, polyacrylates, polybutylenes, polystyrenes, polyacrylonitriles, acetals, polyamides, polysulfones, polyurethanes, polyphenylene oxide, or combinations comprising at least one of the foregoing materials.

18. A releasable fastener system comprising:
   a hook portion comprising a hook support and a plurality of hook elements, wherein the hook elements comprises a thermoplastic, thermoset, or shape memory material adapted to break at a defined temperature;

a loop portion comprising a loop support and a loop material formed on the loop support, wherein the loop material comprises a thermally conductive material; and an activation device in electrical communication with the loop support, wherein the activation device is adapted to provide in activation signal to the loop support and heat the loop support to a temperature equal to or greater than the defined temperature to effect the break.

19. The releasable fastener system of claim 18, wherein the thermally conductive material comprises a metal.

20. The releasable fastener system of claim 18, wherein the activation signal comprises an electric current, wherein the electric current is effective to heat the loop support to the temperature equal to or greater than the defined temperature.

21. The releasable fastener system of claim 18, wherein the thermoplastic, thermoset, or shape memory material comprises polyphosphazenes, poly(vinyl alcohols), polyester amides, poly(amino acid)s, polyanhydrides, polyacrylamides, polyalkene glycols, polyalkene oxides, polyalkene terephthalates, polyortho esters, polyvinyl ethers, polyvinyl esters, polyvinyl halides, polylactides, polyglycolides, polysiloxanes, polyurethanes, polyethers, polyether amides, polyether esters, polyalkenes, polycarbonates, polyesters, polycarbonates, polyacrylates, polybutylenes, polystyrenes, polyacrylonitriles, polyvinylchlorides, acetals, polyamides, polysulfones, polyurethanes, acrylates, polyphenylene oxide, or combinations comprising at least one of the foregoing materials.

22. An on-demand process for releasing a releasable fastener system, the process comprising:

applying a current to an engaged releasable fastener system, wherein the releasable fastener system comprises a hook portion comprising a hook support and a plurality of hook elements, wherein the hook elements comprise a material adapted to break at a defined temperature, a loop portion comprising a loop material and a loop support, wherein the loop material comprises an electrically and thermally conductive material, and an activation device in electrical communication with the loop material, wherein the activation device is adapted to provide an activation signal to the loop material and heat the loop material to a temperature equal to or greater than the defined temperature to effect the break; and breaking the hook elements at a point of contact with the loop material upon activation of the activation signal and releasing the hook portion from the loop portion.

23. The on-demand process for releasing a releasable fastener system of claim 22, further comprising:

re-engaging the hook portion with the loop portion;

applying a current to an engaged releasable fastener system; and melting, flowing, or volatizing a portion of the hook elements in contact with the loop material and releasing the hook portion from the loop portion.

24. An on-demand process for releasing a releasable fastener system, the process comprising:

applying a current to an engaged releasable fastener system, wherein the releasable fastener system comprises a hook portion comprising a hook support and a plurality of hook elements, wherein the hook elements comprise an electrically and thermally conductive material, a loop portion comprising a loop material and a loop support, wherein the loop material comprises a material adapted to break at a defined temperature, and an activation device in electrical communication with the hook elements, wherein the activation device is adapted to provide an activation signal to the hook elements and heat the hook elements to a temperature equal to or greater than the defined temperature to effect the break; and breaking the loop material at a point of contact with the hook elements upon application of the activation signal and releasing the hook portion from the loop portion.

25. The on-demand process for releasing a releasable fastener system of claim 24, further comprising:

re-engaging the hook portion with the loop portion, applying a current to the re-engaged releasable fastener system; and melting, flowing, or volatizing a portion of the loop material in contact with the hook elements and releasing the hook portion from the loop portion.

* * * * *